March 10, 1925.  
E. N. FALES  
PORTABLE WIND TUNNEL  
Filed Sept. 23, 1922  
1,528,917  
2 Sheets-Sheet 1
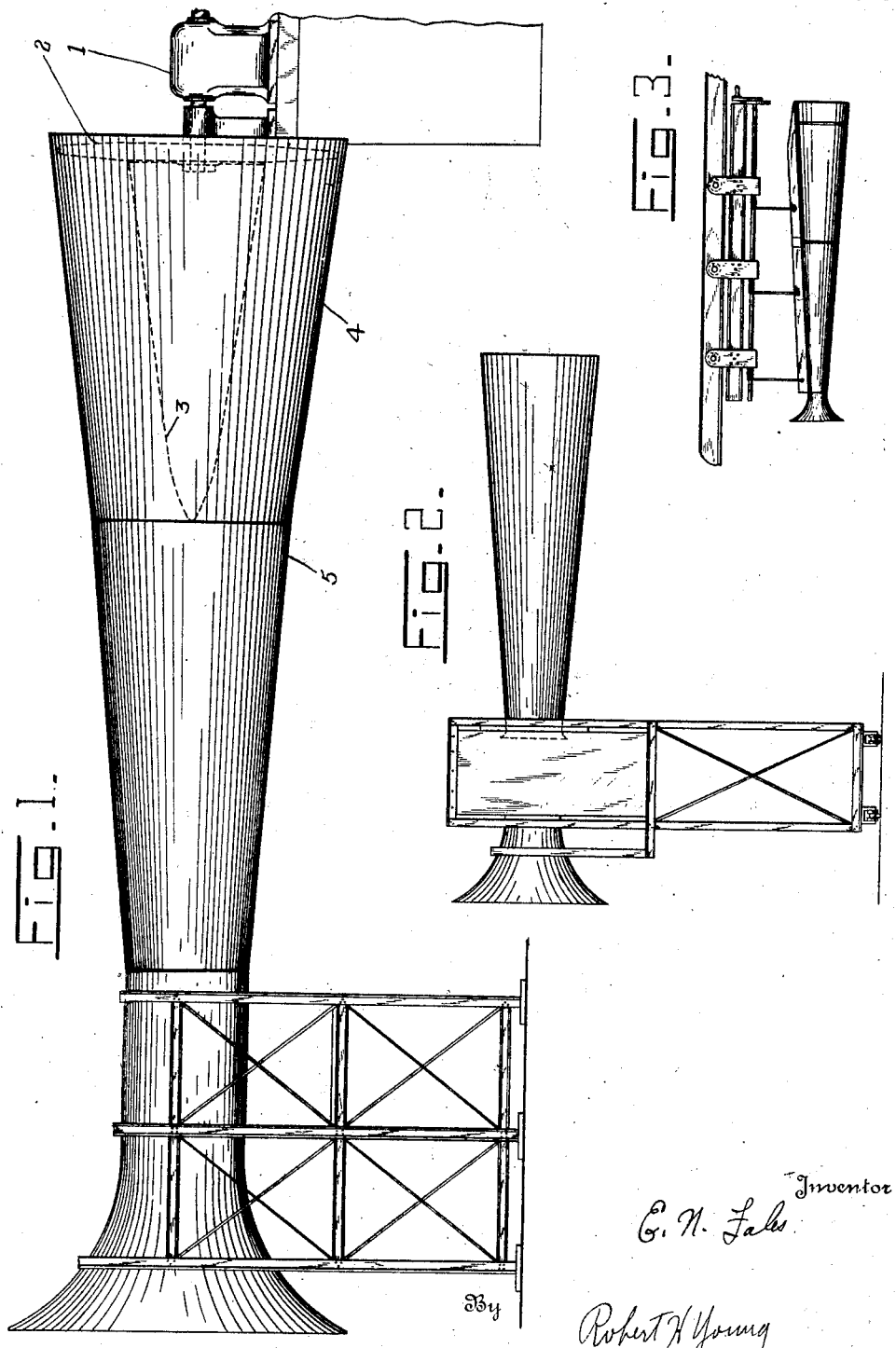

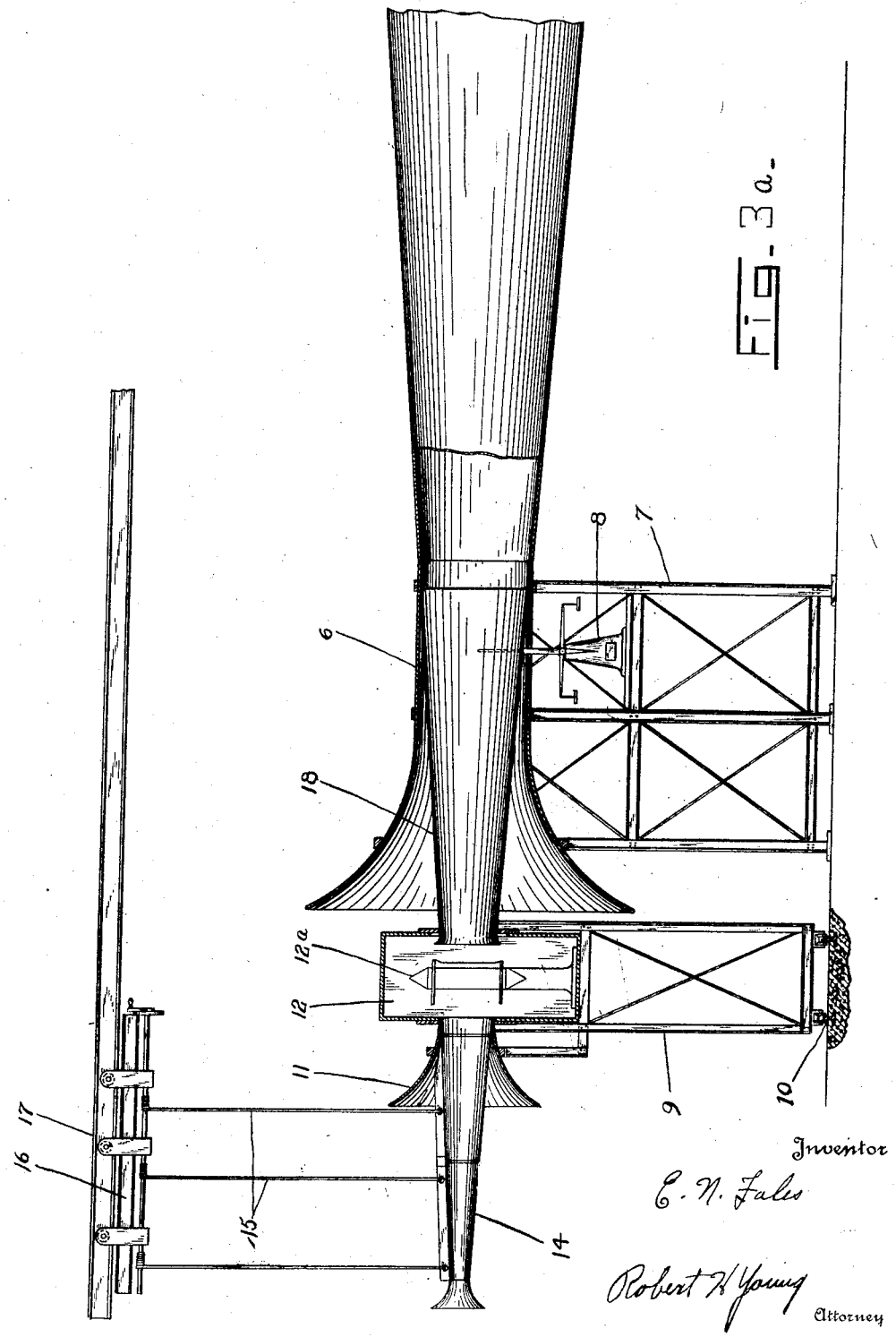

Patented Mar. 10, 1925.

1,528,917

UNITED STATES PATENT OFFICE.

ELISHA N. FALES, OF LAKE FOREST, ILLINOIS.

PORTABLE WIND TUNNEL.

Application filed September 23, 1922. Serial No. 590,118.

*To all whom it may concern:*

Be it known that I, ELISHA N. FALES, a citizen of the United States, residing at Lake Forest, in the county of Lake and State of Illinois, have invented certain new and useful Improvements in Portable Wind Tunnels, of which the following is a specification.

My invention relates in general to wind tunnels and more particularly to a wind tunnel system various component parts of which are readily portable to provide a plurality of types of air streams for the purposes desired.

The expense of wind tunnel construction is well known to those familiar with the art, and it is the object of my invention to provide a wind tunnel with a plurality of portable portions, such that one wind tunnel system may be used to answer the purposes of several wind tunnels designed to meet particular and widely differing needs.

It is an object of my invention to provide a wind tunnel system such that, by the use of a single power plant and a single main deceleration cone in combination with various portable members, a plurality of types of air currents may be produced.

Other objects of my invention will be found in the accompanying specification and claims and be disclosed in the drawings, in which—

Figure 1 is a diagrammatic showing in side elevation of my power plant, balance system and deceleration cone;

Figure 2 is a side elevation in line diagram of an additional device adapted to be moved into axial alignment with the device shown in Figure 1;

Figure 3 shows in line diagram, and side elevation a third device adapted to be moved into axial alignment with either the device shown in Figure 1 or a combination of devices shown in Figures 1 and 2;

Figure 3ᵃ shows a section of the device shown in Figure 3 moved into axial alignment with the parts of Figures 1 and 2.

Referring to the drawings with greater particularity, 1 is a motor or power plant, 2 the fan for producing necessary air blasts, 3 is a core for straightening out lines of flow of the air blast, 4 is the casing surrounding said core and fan, constituting, with 5, a deceleration cone. At 6 there is shown the usual throat assembly, including the usual balance device 8 supported on frame 7 and suitable means for supporting the models in the interior of the throat will be provided. I have shown the throat in the throat assembly 6 to be a relatively large bore.

A frame 9, portably carried on the rails 10 and supporting a second intake bell 11 and experimental chamber 12, is adapted to be moved into or out of axial alignment with that of the assembly shown in Figure 1. The experimental chamber 12 contains balance 12ᵃ, the whole being hermetically sealed and constituting a gap in the air conduit. When it is desired to use the throat assembly 11, it is necessary to provide a connecting deceleration cone 18 which is so designed as to fit into the throat assembly at its narrowest portion in such a manner that the line of the deceleration cone 5 shall be continuous throughout the throat 6 and the air currents flowing throughout will not be disturbed before reaching the throat assembly 11.

On an overhead rail 17 there is portably mounted a crane 16 which has suspending cables 15 for lowering into position a third throat 14 of smaller dimensions than the ones heretofore mentioned for the purpose of obtaining a still different type of air flow.

From the foregoing description it will be seen that the operation of my device is as follows:

When it is desired to test a model at comparatively low speeds the throat of the type shown in Figure 1 is used. When it is desired to use a higher speed throat or when it is desired to utilize an experimental chamber of the "gap" type, it is not necessary to use a different wind tunnel but the throat assembly 11 is merely moved along its rails in position of axial alignment with the throat assembly 6, after having inserted connecting deceleration cone 18 into the experimental chamber 12. A new and different type of wind tunnel is thereby effectively produced. If it is desired to use a throat of the type shown in Figure 3, all that is necessary is that this throat shall be swung into position by means of its crane and cables and a third type of wind tunnel, complete in every detail, and differing widely in its characteristics from the other two, is obtained.

What I claim is:

1. In an adjustable wind tunnel system, a power plant, air propelling means, operatively connected with said plant, a main deceleration cone communicating with said air propelling means, and a plurality of portable wind tunnel throats adapted to be moved into registration with said main deceleration cone to vary the character of air flow through said wind tunnel.

2. In a wind tunnel system, a power plant, air propelling means operatively connected with said plant, a main deceleration cone communicating with said air propelling means, and a plurality of portable wind tunnel throats of different dimensions adapted to be moved into registration with said main deceleration cone.

3. In a wind tunnel system, a power plant, air propelling means operatively connected with said plant, a main deceleration cone communicating with said air propelling means, and a plurality of portable wind tunnel throats of different characteristics adapted to be moved into registration with said main deceleration cone.

4. In a wind tunnel system, a power plant, air propelling means operatively connected with said plant, a main deceleration cone and wind tunnel throat communicating with said air propelling means, a second wind tunnel throat portably mounted and adapted to be moved into axial alignment with said main wind tunnel throat for the purpose described.

5. In a wind tunnel system, a power plant, air propelling means operatively connected with said plant, a main deceleration cone and wind tunnel throat communicating with said air propelling means, a second wind tunnel throat portably mounted and adapted to be moved into axial alignment with said main wind tunnel throat, and an auxiliary deceleration cone for connecting said portable throat with said main throat.

6. In a wind tunnel system, a power plant, air propelling means operatively connected with said plant, a main deceleration cone and wind tunnel throat communicating with said air propelling means, a second wind tunnel throat of smaller dimensions portably mounted and adapted to be moved into axial alignment with said main wind tunnel throat, and an auxiliary deceleration cone for connecting said portable throat with said main throat.

7. In a wind tunnel system, a power plant, air propelling means operatively connected with said plant, a main deceleration cone and wind tunnel throat communicating with said air propelling means, a second wind tunnel throat of different characteristics from said first named throat portably mounted and adapted to be moved into axial alignment with said main wind tunnel throat, and an auxiliary deceleration cone for connecting said portable throat to said main throat.

8. In combination, in a wind tunnel system, a power plant, air propelling means operatively connected with said plant, a main deceleration cone and throat communicating with said air propelling means, a second throat suitably mounted on the rail and adapted to be moved into axial alignment with said first-named throat, connecting means between said two throats, and a third throat portably mounted on overhead rails and adapted to be swung to axial alignment with the two aforesaid throats.

In testimony whereof I affix my signature.

ELISHA N. FALES.